(12) United States Patent
Caruso et al.

(10) Patent No.: US 11,238,511 B2
(45) Date of Patent: Feb. 1, 2022

(54) HOME DÉCOR COLOR MATCHING

(71) Applicant: PPG Industries Ohio, Inc., Cleveland, OH (US)

(72) Inventors: Christopher Caruso, Pittsburgh, PA (US); Kevan M. Farley, Monroeville, PA (US); Phillip J. Behrens, McDonald, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 12 days.

(21) Appl. No.: 15/575,456

(22) PCT Filed: May 19, 2016

(86) PCT No.: PCT/US2016/033289
§ 371 (c)(1),
(2) Date: Nov. 20, 2017

(87) PCT Pub. No.: WO2016/191206
PCT Pub. Date: Dec. 1, 2016

(65) Prior Publication Data
US 2018/0158123 A1    Jun. 7, 2018

Related U.S. Application Data

(60) Provisional application No. 62/165,792, filed on May 22, 2015.

(51) Int. Cl.
*G06Q 30/06* (2012.01)
(52) U.S. Cl.
CPC ..... *G06Q 30/0621* (2013.01); *G06Q 30/0623* (2013.01); *G06Q 30/0631* (2013.01); *G06Q 30/0641* (2013.01)

(58) Field of Classification Search
None
See application file for complete search history.

(56) References Cited

U.S. PATENT DOCUMENTS 5,153,825 A    10/1992  Yauk et al.
5,537,228 A     7/1996  Dillinger
(Continued)

FOREIGN PATENT DOCUMENTS

CA    2544778    5/2005
EP    0484564    5/1992
(Continued)

OTHER PUBLICATIONS

Kohrs, Arnd, and Bernard Merialdo. "Using color and texture indexing to improve collaborative filtering of art paintings." Proc. of European Workshop on CBMI. vol. 99. 1999. (Year: 1999).*
(Continued)

*Primary Examiner* — Michelle T Kringen
(74) *Attorney, Agent, or Firm* — Michael J. Frodsham

(57) ABSTRACT

In one scenario, a computer system receives from a user an indicator of a home décor item. The computer system identifies a color associated with the presented home décor item, and further determines other home décor items that have colors that coordinate with the color of the presented home décor item. The computer system also displays to the user images of the determined other home décor items, receives user input selecting some of the displayed home décor items and informs the user which of the selected home décor items are available at the retail establishment.

20 Claims, 6 Drawing Sheets

(56) References Cited

U.S. PATENT DOCUMENTS

| | | | |
|---|---|---|---|
| 5,739,806 | A | 4/1998 | Hissen et al. |
| 5,761,392 | A | 6/1998 | Yacoub et al. |
| 6,014,221 | A | 1/2000 | Plude, Jr. |
| 6,122,391 | A | 9/2000 | Ringland et al. |
| 6,528,109 | B1 | 3/2003 | Filev |
| 6,563,510 | B1 | 5/2003 | Rice et al. |
| 6,628,829 | B1 | 9/2003 | Chasen |
| 6,717,584 | B2 | 4/2004 | Kulczycka |
| 6,727,925 | B1 | 4/2004 | Bourdelais |
| 6,772,151 | B1 | 8/2004 | Johnston et al. |
| 6,870,544 | B2 | 3/2005 | Blanchard et al. |
| 6,973,211 | B2 | 12/2005 | McClanahan et al. |
| 6,977,650 | B2 | 12/2005 | Voye et al. |
| 6,999,615 | B2 | 2/2006 | McClanahan et al. |
| 7,106,343 | B1 | 9/2006 | Hickman |
| 7,145,656 | B2 | 12/2006 | Rodrigues et al. |
| 7,187,386 | B2 | 3/2007 | Rice et al. |
| 7,193,632 | B2 | 3/2007 | Rice et al. |
| 7,243,063 | B2 | 7/2007 | McMullen et al. |
| 7,249,063 | B2 | 7/2007 | McMullen et al. |
| 7,277,572 | B2 | 10/2007 | MacInnes et al. |
| 7,330,585 | B2 | 2/2008 | Rice et al. |
| 7,337,162 | B2 | 2/2008 | Lewis |
| 7,466,415 | B2 | 12/2008 | Gibson et al. |
| 7,474,314 | B2 | 1/2009 | Minchew et al. |
| 7,605,824 | B2 | 10/2009 | Reynolds et al. |
| 7,743,055 | B2 | 6/2010 | Rodrigues et al. |
| 7,859,545 | B2 | 12/2010 | Tokunaga |
| 8,319,788 | B2 | 11/2012 | Buzyn et al. |
| 8,427,498 | B2 | 4/2013 | Ou et al. |
| 9,633,448 | B1 * | 4/2017 | Dorner ................. G06T 7/90 |
| 2001/0034668 | A1 | 10/2001 | Whitworth |
| 2001/0041966 | A1 | 11/2001 | Corrigan et al. |
| 2003/0216972 | A1 | 11/2003 | Gotou et al. |
| 2004/0093112 | A1 | 5/2004 | Marchand et al. |
| 2004/0267596 | A1 | 12/2004 | Lind et al. |
| 2005/0099630 | A1 | 5/2005 | Reynolds |
| 2006/0001677 | A1 | 1/2006 | Webb |
| 2006/0210153 | A1 | 9/2006 | Sara |
| 2007/0018906 | A1 | 1/2007 | Visnovsky et al. |
| 2007/0032965 | A1 | 2/2007 | McClanahan et al. |
| 2008/0299521 | A1 | 12/2008 | Taylor et al. |
| 2008/0305241 | A1 | 12/2008 | Trevino, III et al. |
| 2009/0183122 | A1 | 7/2009 | Webb et al. |
| 2009/0248199 | A1 | 10/2009 | Milhorn |
| 2009/0274827 | A1 | 11/2009 | Anderson et al. |
| 2009/0295823 | A1 | 12/2009 | Henry |
| 2010/0033318 | A1 | 2/2010 | Tampke |
| 2010/0094681 | A1 * | 4/2010 | Almen ................ G06Q 30/02 705/7.29 |
| 2010/0169336 | A1 | 7/2010 | Eckhoff-Hornback et al. |
| 2010/0194776 | A1 | 8/2010 | Chong et al. |
| 2010/0228511 | A1 * | 9/2010 | Chin ................. G01J 3/462 702/82 |
| 2010/0235400 | A1 | 9/2010 | Myers et al. |
| 2010/0262551 | A1 | 10/2010 | Caruso |
| 2011/0145051 | A1 | 6/2011 | Paradise et al. |
| 2011/0170770 | A1 | 7/2011 | Remedios |
| 2011/0208565 | A1 | 8/2011 | Ross et al. |
| 2012/0123583 | A1 | 5/2012 | Hazen et al. |
| 2012/0170836 | A1 | 7/2012 | Henry et al. |
| 2012/0219699 | A1 | 8/2012 | Pettersson et al. |
| 2013/0215116 | A1 * | 8/2013 | Siddique ............ G06Q 30/0643 345/420 |
| 2013/0300761 | A1 * | 11/2013 | Ahmed ................. G09G 5/02 345/595 |
| 2014/0164913 | A1 * | 6/2014 | Jaros ................. G06F 16/9577 715/243 |
| 2014/0174595 | A1 | 6/2014 | Millhorn |
| 2014/0289069 | A1 | 9/2014 | Bhardwaj et al. |
| 2015/0235389 | A1 * | 8/2015 | Miller ............... G06Q 30/0643 345/594 |
| 2016/0307151 | A1 * | 10/2016 | Grabovski ......... G06Q 30/0207 |
| 2018/0137553 | A1 | 5/2018 | Caruso et al. |
| 2018/0158124 | A1 | 6/2018 | Caruso et al. |

FOREIGN PATENT DOCUMENTS

| | | | |
|---|---|---|---|
| EP | 0915401 | A2 | 5/1999 |
| JP | 2001-209784 | A | 8/2001 |
| JP | 2002-230083 | A | 8/2002 |
| JP | 2003-016150 | A | 1/2003 |
| JP | 2003-108865 | A | 4/2003 |
| JP | 2006-504969 | A | 2/2006 |
| JP | 2014-510322 | A | 4/2014 |
| WO | 92/20024 | A1 | 11/1992 |
| WO | 0213136 | | 2/2002 |
| WO | 2004/042336 | A1 | 5/2004 |
| WO | 2006/049290 | A1 | 5/2006 |
| WO | 2009/009745 | A1 | 1/2009 |
| WO | 2009120527 | | 10/2009 |
| WO | 2011089094 | | 7/2011 |
| WO | 2013092677 | | 6/2013 |
| WO | 2016/172316 | A1 | 10/2016 |

OTHER PUBLICATIONS

International Search Report and Written Opinion for application No. PCT/US2016/033309, dated Jan. 12, 2016.
Non-Final Office Action for U.S. Appl. No. 15/575,431 dated Jan. 15, 2018.
International Search Report and Written Opinion for application No. PCT/US2016/033327 dated Jul. 27, 2016.
International Search Report and Written Opinion for application No. PCT/US2016/033309 dated Jul. 20, 2016.
International Search Report and Written Opinion for application No. PCT/US2016/033260 dated Aug. 31, 2016.
International Preliminary Report on Patentability for PCT/US2016/033309 dated Nov. 28, 2017.
International Preliminary Report on Patentability for PCT/US2016/033327 dated Nov. 28, 2017.
International Preliminary Report on Patentability for PCT/US2016/033289 dated Nov. 28, 2017.
International Preliminary Report on Patentability for PCT/US2016/033260 dated Nov. 28, 2017.
Examiner Requisition for CA 02986454 dated Jul. 24, 2018.
Examiner Requisition for CA 02986454 dated Jul. 4, 2018.
Examiner Requisition for CA 02986457 dated Jul. 24, 2018.
Examiner Requisition for CA 02986457 dated Jun. 26, 2019.
Examiner Requisition for CA 02986452 dated Jun. 18, 2019.
Examiner Requisition for CA 02986452 dated Jul. 23, 2018.
Examiner Requisition for CA 02986436 dated Sep. 4, 2018.
Examiner Requisition for CA 02986452 dated Aug. 7, 2019.
International Search Report and Written Opinion for application No. PCT/US2016/033309 dated Dec. 1, 2016.
Office Action issued by European Patent Office for application No. 16728160.9-1217, dated Mar. 18, 2019.
Office Action for U.S. Appl. No. 15/575,474, dated Feb. 10, 2020.
Examiner Interview Summary received for U.S. Appl. No. 15/575,528, dated Feb. 3, 2021, 2 pages.
Notice of Allowance received for U.S. Appl. No. 15/575,528, dated Feb. 3, 2021, 19 pages.
Office Action for European Patent Application No. 16728159.1, dated Nov. 30, 2020, 29 pages.
Final Office Action received for U.S. Appl. No. 15/575,528, dated Sep. 15, 2020, 29 pages.
Office Action received for European Patent Application No. 16728160.9, dated Jun. 15, 2020, 8 pages.
Reasons for Refusal for Japanese Patent Application JP2014-510322. dated Aug. 12, 2014.
Examiner Interview Summary received for U.S. Appl. No. 15/575,528, dated Jul. 1, 2020, 2 pages.
International Search Report and Written Opinion for application No. PCT/US2016/033289 dated Jul. 19, 2016.
Jay Joichi: "Imrpoving Color Exploration and Visualization on the ColorSmart by BEHR.TM. Application", Proceeding DUX '05

(56) References Cited

OTHER PUBLICATIONS

Proceedings of the 2005 Conference on Designing for User Experience Article No. 4, Jan. 1, 2005, retrieved from the internet: URL:http://delivery.acm.org/10.1145/1140000/1138240/a4-joichi.pdf?ip=145.-64.134.245&acc-ACTIVE.
Office Action received for Canadian Application No. 2986454, dated Jun. 3, 2020, 6 pages.
Office Action received for European Patent Application No. 16728159.1,dated Jun. 4, 2020, 5 pages.
European Office Action for EP Application 16721306.5, dated Dec. 18, 2020. (8 pages).
Notice of Allowance received for U.S. Appl. No. 15/575,528, dated Mar. 9, 2021, 2 pages.

* cited by examiner

HOME DÉCOR COLOR MATCHING

BACKGROUND

Many homeowners upgrade the look of their homes by doing home projects. In a majority of these projects the homeowner paints one or more rooms. The homeowner may have a general idea of which paint colors to use, but often goes to a hardware or paint store to obtain paint swatches to identify colors they may be interested in using. These paint swatches may provide an indication of what various paint colors look like when dry. The homeowner then takes the paint swatches home to hold up on the wall and determine which color(s) look best.

In conjunction with the paint, the homeowner may also want to purchase new home décor items such as rugs, drapes, paintings, picture frames or furniture. These home décor items, when used with the selected paint colors, combine to form a cohesive room. In order to make the room look properly finished, the home décor items will need to match or complement the paint color. Indeed, if the home décor items do not match the color of the paint, the room may appear incoherent and off-putting.

Accordingly, homeowners want to match the colors of the home décor items with the colors of the paint they have chosen. Properly matching these items to a given color of paint is an arduous process. The user must take a sample or swatch of the paint around with them in the store and look for items that would match the paint. This process is time and labor intensive and, if the homeowner does not have a keen eye for color matching, may prove fraught with error. Moreover, typical home goods stores and home repair stores have many thousands of items located on many different aisles throughout the store. Each of these items has its own packaging which may further impede the homeowner in determining which products match their chosen color(s). As such, the homeowner has no easy and efficient way of determining which products offered for sale in the store color coordinate with their chosen paint color.

BRIEF SUMMARY

The present invention described herein is directed to identifying and selecting, for a home project, home décor items of a retail establishment that color coordinate, through a kiosk at a point of sale location corresponding to the retail establishment and to identifying and selecting, for a home project, home décor items of a retail establishment that color coordinate. In one case, a computer system receives from a user an indicator of a home décor item. The computer system identifies at least one color associated with the presented home décor item, and further determines other home décor items that have colors that coordinate with the color of the presented home décor item. The computer system also displays to the user images of the determined other home décor items, receives user input selecting some of the displayed home décor items and informs the user which of the selected home décor items are available at the retail establishment.

In another case, a computer system for identifying and selecting home décor items of a retail establishment that color coordinate to a home project is provided. The system includes a computerized device for positioning at a kiosk at a point of sale location corresponding to a retail establishment. The computerized device includes a display and an input device. The computerized device is adapted to perform the following: receive an indicator of a home décor item, determine a color associated with the indicated home décor item, determine other home décor items that have colors that coordinate with the color of the indicated home décor item, display images of the other home décor items on the display, receive user input via the input device selecting some of the displayed home décor items, and inform the user via the display which of the selected home décor items are available at the retail establishment.

In another case, a kiosk computer system is provided. The kiosk computer system includes one or more processors, a receiving module for receiving from a user an indicator of a home décor item, a color identifying module for identifying a color associated with the presented home décor item, a home décor item determining module for determining other home décor items that have colors that coordinate with the color of the presented home décor item, a display for displaying to the user images of the determined other home décor items, the receiving module receiving user input selecting some of the displayed home décor items, and an informing module for informing the user which of the selected home décor items are available at the retail establishment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of the present invention may be realized and obtained by means of the instruments and combinations particularly pointed out in the appended claims. Features of the present invention will become more fully apparent from the following description and appended claims.

BRIEF DESCRIPTION OF THE DRAWINGS

To further clarify the above and other features of the present invention, a more particular description will be rendered by reference to the appended drawings. It is appreciated that these drawings depict only examples of the present invention and are therefore not to be considered limiting of its scope. The present invention will be described and explained with additional specificity and detail through the use of the accompanying drawings in which.

DETAILED DESCRIPTION

Figure 1:
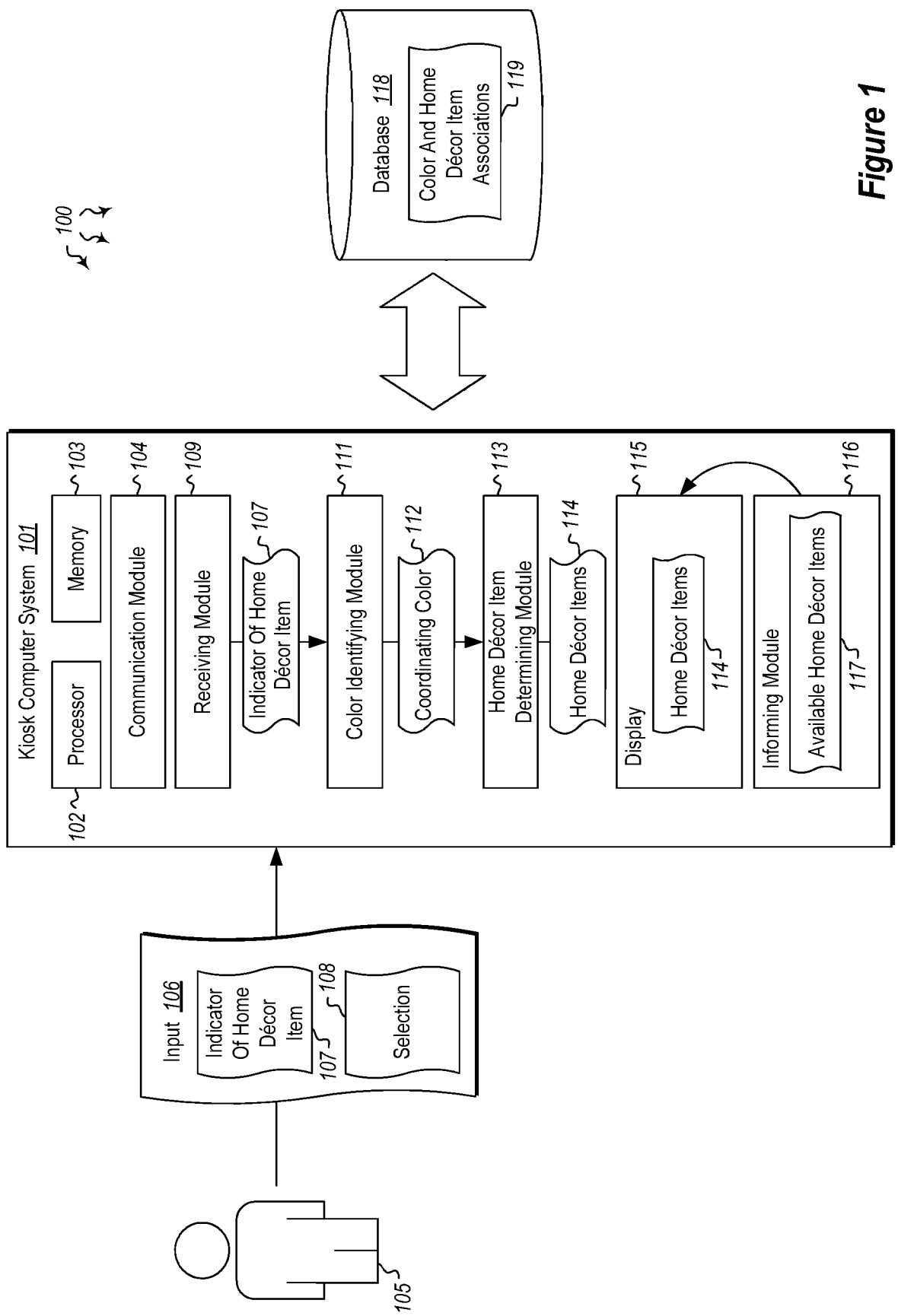
FIG. 1 illustrates a computer architecture in which the present invention may operate including identifying and selecting, for a home project, home décor items of a retail establishment that color coordinate, through a kiosk at a point of sale location corresponding to the retail establishment.

The present invention is directed to identifying and selecting, for a home project, home décor items of a retail establishment that color coordinate, through a kiosk at a point of sale location corresponding to the retail establishment and to identifying and selecting, for a home project, home décor items of a retail establishment that color coordinate. In one example, a computer system receives from a user an indicator of a home décor item. The computer system identifies at least one color associated with the presented home décor item, and further determines other home décor items that have colors that coordinate with the color of the presented home décor item. The computer system also displays to the user images of the determined other home décor items, receives user input selecting some of the displayed home décor items and informs the user which of the selected home décor items are available at the retail establishment.

In another example, a computer system for identifying and selecting home décor items of a retail establishment that color coordinate to a home project is provided. The system includes a computerized device for positioning at a kiosk at a point of sale location corresponding to a retail establishment. The computerized device includes a display and an input device. The computerized device is adapted to perform the following: receive an indicator of a home décor item, determine a color associated with the indicated home décor item, determine other home décor items that have colors that coordinate with the color of the indicated home décor item, display images of the other home décor items on the display, receive user input via the input device selecting some of the displayed home décor items, and inform the user via the display which of the selected home décor items are available at the retail establishment.

In another example, a kiosk computer system is provided. The kiosk computer system includes one or more processors, a receiving module for receiving from a user an indicator of a home décor item, a color identifying module for identifying a color associated with the presented home décor item, a home décor item determining module for determining other home décor items that have colors that coordinate with the color of the presented home décor item, a display for displaying to the user images of the determined other home décor items, the receiving module receiving user input selecting some of the displayed home décor items, and an informing module for informing the user which of the selected home décor items are available at the retail establishment.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

The present invention may implement various types of computing systems, and may use these computing systems to perform computerized methods. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system.

In this description and in the claims, the term "computing system" is defined broadly as including any device or system (or combination thereof) that includes at least one physical and tangible hardware processor, and a physical and tangible hardware or firmware memory capable of having thereon computer-executable instructions that may be executed by the processor. A computing system may be distributed over a network environment and may include multiple constituent computing systems.

As illustrated in FIG. 1, a kiosk computing system 101 may include at least one processing unit 102 and memory 103. The memory 103 may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, the present invention is described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media or computer-readable hardware storage devices that form a computer program product.

An example of such an operation involves the manipulation of data. The computer-executable instructions (and the manipulated data) may be stored in the memory 103 of the computing system 101. Kiosk computing system 101 may also contain communication channels that allow the computing system 101 to communicate with other message processors over a wired or wireless network. Such communication channels may include hardware-based receivers, transmitters or transceivers, which are configured to receive data, transmit data or perform both.

The present invention may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

The present invention also include physical and other computer-readable media for carrying or storing computer-executable instructions and/or data structures. Such computer-readable media can be any available media that can be accessed by a general-purpose or special-purpose computer system. Computer-readable media or storage devices that store computer-executable instructions and/or data structures are computer storage media or computer storage devices. Computer-readable media that carry computer-executable instructions and/or data structures are transmission media. Thus, by way of example, and not limitation, the present invention may comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the present invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The present invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the present invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which the present invention may be employed. Computer architecture 100 includes kiosk computer system 101 (or simply "kiosk 101" herein). Kiosk computer system 101 may be any type of local or distributed computer system, including a cloud computing system. The kiosk computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The kiosk computer system 101 may further include a receiving module 109. The receiving module 109 may receive input 106 from a user 105. The input 106 may include an indicator of a home décor item 107 (or "indicator 107" or "home décor item indicator 107" herein), along with home décor item selections 108. The indicator of a home décor item 107 may be any type of identifier, name, product ID, serial number, bar code or other information that could be used to identify a home décor item. The home décor item may be used on a home project, such as an indoor or outdoor remodeling, redecorating, or other type of project. Any information related to that project may be referred to herein as "project information". This project information may include any type of data related to a specified home or business project. A home or business project may include remodeling, repainting, redecorating, adding or removing spaces or even building a new home or office.

The project information may thus include materials, timelines, home décor objects including artwork or furniture, budget information or any other information related to a work that is to be performed on a house, office or other spaces including outdoor spaces. Specifically, in some of the present invention, the project information will be related to remodeling or redecorating projects where a user (e.g. 105) is remodeling or redecorating one or more rooms and is using the kiosk computer system 101 to determine a paint color to use on the project. Indeed, in most cases, when the user is remodeling or redecorating, the user will want to color coordinate a paint color with other home décor items, or find home décor items that go with selected paint colors.

The kiosk computer system 101 may thus receive user input 106 and apply that input to a specific task. The color identifying module 111 of kiosk computer system 101 may analyze the home décor item indicator 107 received in the user input 106. The home décor item indicator 107 may specify one or more home décor items 114 that the user 105 would like to implement in a home project. For example, the user may remodel their master bedroom, and may wish to use the indicated home décor items in that master bedroom. The color identifying module 111 of the kiosk 101 may identify which home décor item or items were indicated by the indicator 107, and further identify the color (or at least one color) of those items.

The color identifying module 111 may further identify coordinating colors 112 that go along with the determined color of the home décor item. For example, if a user was in a retail establishment and brought a product up to the kiosk 101 and scanned a barcode of that product as an indicator of which item it was, the color identifying module 111 would identify the color of the indicated product and would also identify one or more complementary colors that go along with that color. The coordinating color(s) 112 may be the same color, a similar color, or a corresponding, matching or complementary color. The colors may be identified from a predefined color palette, or may be identified or selected from another color source. The color identifying module 111 may also implement user feedback to identify an appropriate matching or complementary color.

The home décor item determining module 113 of kiosk computer system 101 may then identify one or more home décor items 114 that have a coordinating color 112. The identified home décor items may be colored entirely in the coordinating color, or may only have a portion that is colored with a coordinating color 112. The items that are identified may be those items that are currently in stock at the retail establishment, or may be items that are available in neighboring stores and/or online. The kiosk computer system 101 may be linked (e.g. via communications module 104) to, or may otherwise have access to, product information for a given store.

The kiosk computer system 101 may thus be aware of which products are offered for sale at a given store, and may further be aware of which products are currently in stock at that store (or at other neighboring stores). The home décor item determining module 113 may thus be configured to identify home décor items 114 that are currently in stock at a certain store, are in stock at a neighboring store, or which could be purchased at the store's website or through other channels.

The home décor items 114 may be any type of material or product that is usable in a home project. For instance, the materials may include paints or stains, wallpaper, baseboards, carpeting, wood flooring, curtains, ceramic tile, cupboards, countertops, appliances, faucets, pillows, artwork or any other type of material or item that may be used in a home project. In some cases, project information related to the user's home project may be provided. The project information may include an indication of a layout for some or all of the project materials. Thus, if the project is a kitchen remodel, the user 105 may provide some indication of how the materials are to be spaced or laid out in a given room. This layout information may assist the home décor item determining module 113 in determining what type of project the user is attempting and which home décor items would go with that project type. The kiosk computer system 101 may also be configured to display a specification sheet for one or more of the home décor items. The specification sheet may show the home décor item's dimensions, materials and other associated information.

Once the home décor item determining module 113 has identified one or more home décor items 114 that go with a specific home project, or at least color coordinate with a provide product, the identified home décor items may be displayed in the kiosk display 115. The informing module 116 may be configured to communicate with store computer systems or cloud-based computer systems to determine which items are in stock at that store. If the items are in stock at the store in which the kiosk is located, the informing module 116 may provide an indication of which home décor items are currently available 117 at the store.

If the user provides a selection input 108 indicating that they have selected a home décor item and wish to locate it and/or purchase it, the kiosk may make an association between the home décor item indicator 107 of the item that is to be matched and the home décor item that was determined to match the first item, and that was ultimately selected by the user as an item of interest. These color and home décor item associations may be made by different users many times each day. Each of these associations 119 may be stored in a database 118. In this manner, many different kiosk users may crowd-source correlations or associations between colors and home décor items, and correlations between home décor items and home décor items identified by color. These concepts will be explained further below with regard to methods 200 and 300 of FIGS. 2 and 3, respectively.

Figure 2:
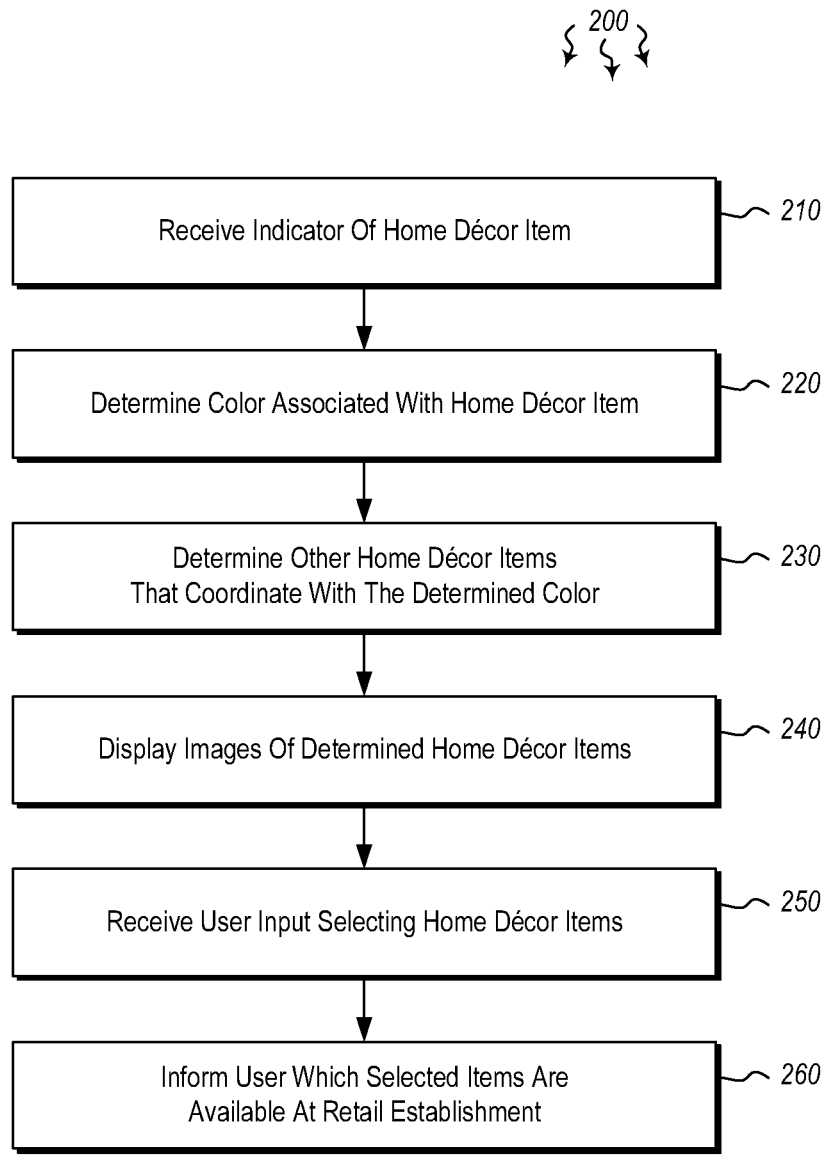
FIG. 2 illustrates a flowchart of an example method for identifying and selecting, for a home project, home décor items of a retail establishment that color coordinate, through a kiosk at a point of sale location corresponding to the retail establishment.
Figure 3:
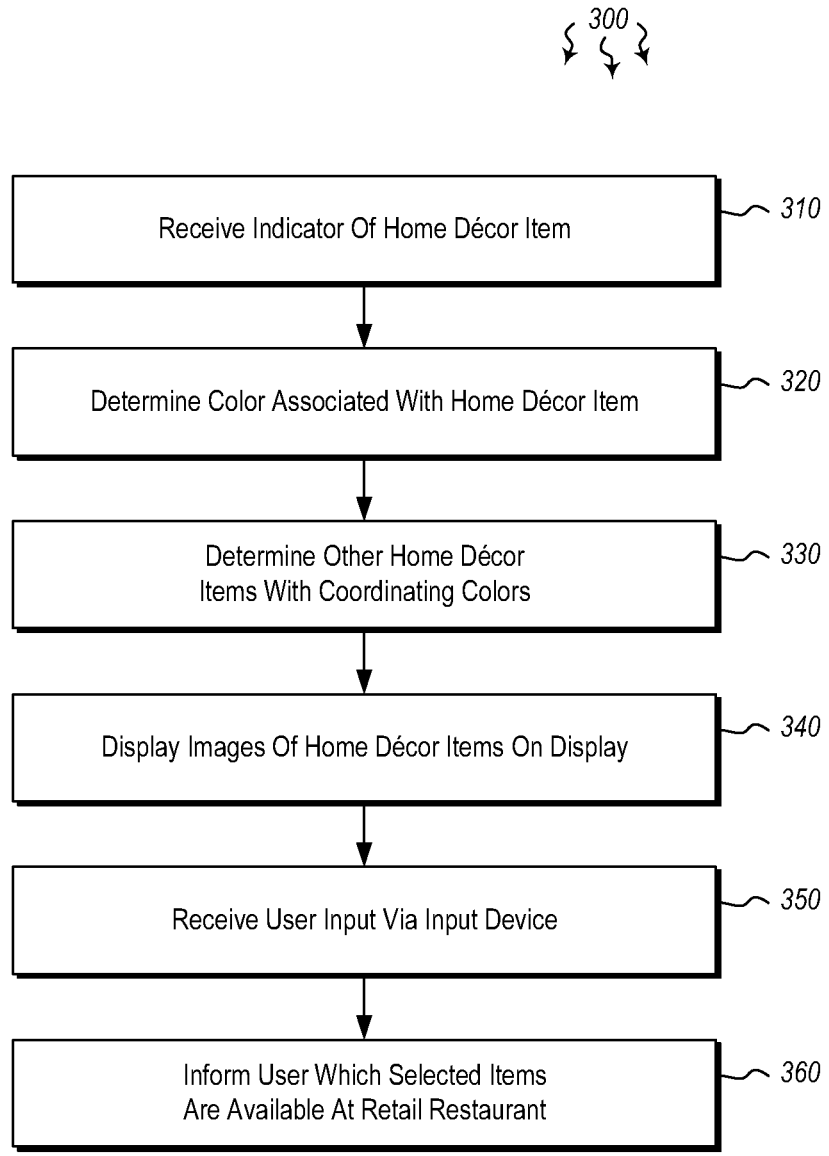
FIG. 3 illustrates a flowchart of an example method for identifying and selecting, for a home project, home décor items of a retail establishment that color coordinate.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for identifying and selecting, for a home project, home décor items of a retail establishment that color coordinate, through a kiosk at a point of sale location corresponding to the retail establishment. The method 200 will now be described with frequent reference to the components and data of environment 100. It should be noted that, while method 200 is described in the context of a kiosk computer system, it will be understood that method 200 may be carried out on a website, where a user accesses the website from a remote or home computer. The website may provide the same functionality as the kiosk computer system 101. After using the website, the user can then go to a store that has a kiosk and pull up his or her project at the kiosk and download the information from an associated portfolio that is stored in the cloud.

Method 200 includes receiving from a user at the kiosk, an indicator of a home décor item (210). For example, receiving module 109 may receive input 106 from user 105. The input 106 may include a home décor item indicator 107. The indicator may be a name or other identifier such as a serial number or stock keeping unit (SKU). Alternatively, the indicator for the home décor item 107 may be a unique identifier such as a barcode, quick response (QR) code, a radio frequency identifier (RFID) or other type of identifier. The indicator 107 may be anything that could be used to identify a given product such as a home décor item or material. The indicator may be an image of a product, perhaps transferred wirelessly from a user's mobile device to the kiosk (e.g. via Bluetooth or Wifi) or may even be a spectrophotometric read of a sample item brought by the user from home.

Method 200 further includes identifying, by the kiosk, at least one color associated with the presented home décor item (220), and determining, by the kiosk, one or more other home décor items that have colors that coordinate with the at least one color of the presented home décor item (230). The color identifying module 111 may identify the color of (or one of the colors of) the identified home décor item, and may further identify one or more colors that coordinate with the color (or one of the colors of) the home décor item. Once the coordinating colors 112 have been identified, the home décor item determining module 113 may identify which home décor items 114 match or color coordinate with the indicated home décor item 107. The identified items 114 may include those products that are in stock and available for purchase at the store, or may include items that are available in neighboring stores or online.

Method 200 next includes displaying to the user, by the kiosk, images of the determined one or more other home décor items (240), receiving, by the kiosk, user input selecting one or more of the displayed home décor items (250), and informing the user, by the kiosk, which of the selected home décor items are available at the retail establishment (260). The home décor items 114 identified by module 113 may be displayed in kiosk display 115. When displayed, the user 105 may view the items and select which ones they are interested in. The selection input 108 may be received by the receiving module 109 and may be passed to the informing module 116. The informing module 116 of the kiosk computer system 101 may be configured to inform the user as to which of the selected items is available at the store or are available online for shipment to the user.

Figure 5:
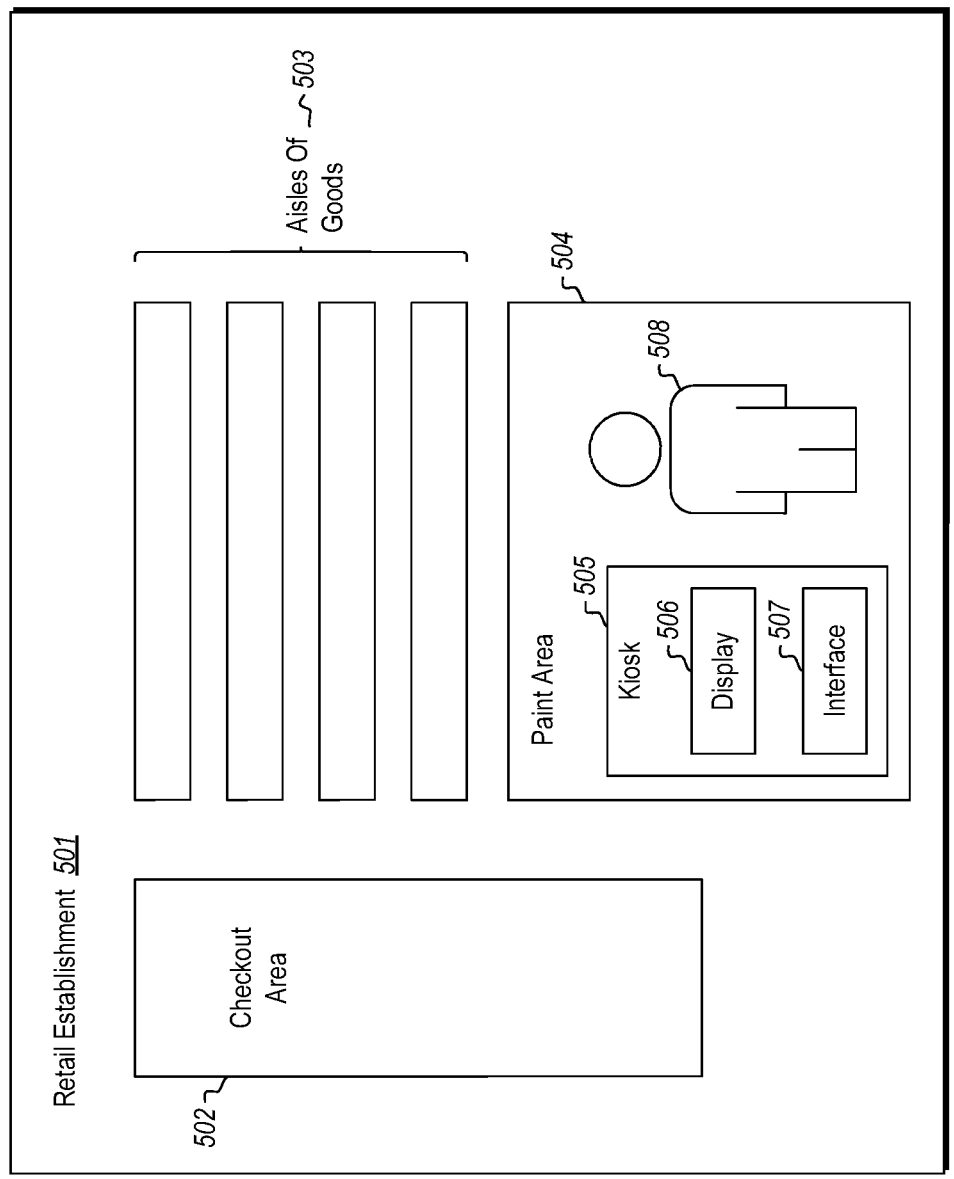
FIG. 5 illustrates a scenario of a retail establishment layout including a paint area and kiosk.

In some cases, informing the user which of the selected home décor items are available at the retail establishment further includes indicating where to locate the available selected home décor items in the retail establishment. As shown in FIG. 5, retail establishment 501 may include multiple different areas including a checkout area 502, various aisles of goods 503 and a paint area 504 (among other areas not shown). The retail establishment may be a hardware store or home goods store or other type of retail establishment. The paint area 504 may be where the kiosk computer system 505 (e.g. kiosk 101 from FIG. 1) is located. The kiosk may include a display 506 and various user interface means 507 including a keyboard, mouse, touchscreen or other user interface hardware. The user 508 may use the kiosk 505 to perform various functions including identifying home décor items that match a specified home décor item or paint color.

Figure 6:
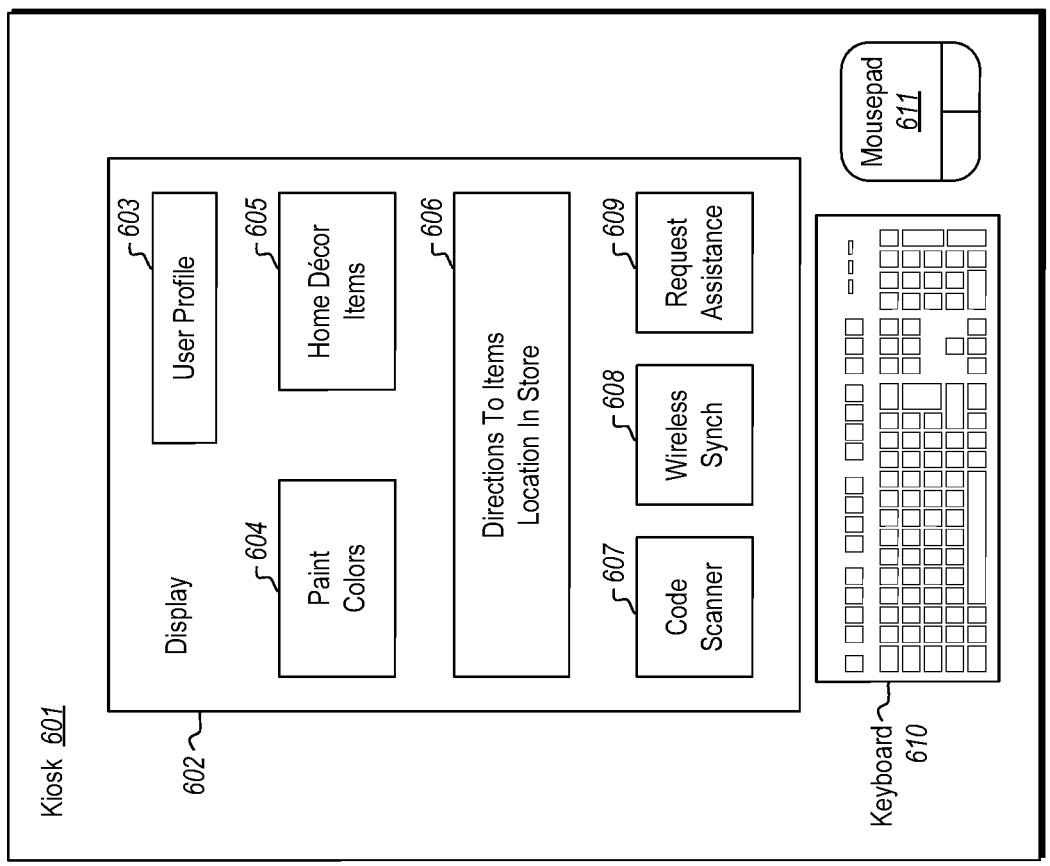
FIG. 6 illustrates a scenario of a kiosk that includes a display and user input devices.

One example of a kiosk is shown in FIG. 6. The kiosk 601 includes a display 602 that displays various project-related items. These items may include, among other things, directions 606 to an item's location within the retail establishment 501. The directions may include an aisle number, a map showing where the specified aisle is located, a video showing directions to the product, or other ways of locating the selected product(s) such as a pin on a digital map.

The kiosk 601 may further display paint colors 604 which may be a color for which color coordinating home décor items are to be found. The kiosk 601 may also display home décor items 605. These may be the home décor items 114 that were identified by the product identifying module as being color coordinated with the identified color 112. The kiosk 601 may also include a code scanner 607 capable of scanning bar codes, QR codes or other types of codes. Using the code scanner, the user may input project information, or may provide indications of products which the user would like to use in their project (e.g. by scanning the product's bar code) and color match to the determined color 112. These products may then be color-matched to other products or project materials available for sale at the store or available online.

The kiosk 601 of FIG. 6 may further include a wireless synchronization feature 608 that allows users to upload images or other project information to the kiosk. The user may use a Bluetooth, WiFi or other wireless connections, for example, between their mobile device and the kiosk 601 to transfer images or other project information. The user may interact with the kiosk using keyboard 610, mouse pad 611 or may interact with the display 602 directly if the display is a touchscreen. The user input devices may allow the user to change settings, make selections, establish a link to a mobile device, scan codes or perform other tasks including requesting assistance. The kiosk 601 may display a request assistance 609 that, when selected, allows the kiosk user to request that a store personnel be notified of the user's interest in a selected product. The user may also use the user interface hardware to select and/or change their user profile 603.

The user profile 603 may include many different kinds of information about the kiosk user including the user's name, current project, past projects, color preferences or color profiles, product or brand name preferences or other information that may be linked to their profile including project information stored on a cloud data store (e.g. database 118 of FIG. 1). Thus, a user may log in at the kiosk 601 and select the user profile button 603 to access their user profile. This profile may list items purchased in the past, items in a wish list, items selected for a current project (including paint colors 604 and home décor items 605) or other project information. At least some portions of the project information may be stored in a cloud data store, and may be accessed on demand by the kiosk 601. This project information may be used to identify other products provided by the retail establishment that would match or correspond to a given project and/or color profile.

In this manner, the kiosk can identify products that are currently in-stock and available at the retail establishment, or are available to be shipped online. In some cases, the user may be shown directions to the products they have selected, or they may be guided to the location of the products by a store personnel who has been notified of the user's interest in that product, or may notify another entity that the selected products are to be automatically retrieved and given to the user. In other cases, a user may select a paint color and/or one or more home décor items online. The user may then be able to print out a unique barcode or quick response (QR) code. The user can then take that printed barcode or QR code to the kiosk at the store where their project could be accessed (using the code) for further editing. Additionally or alternatively, the kiosk may access the user's project, identify the associated products, and point the user to those products or to a store assistant who could help the user find the products.

Returning to FIG. 1, in some cases, the kiosk computer system 101 may be configured to automatically retrieve an image and/or other data corresponding to the available selected home décor items 117. The retrieved image and/or data may then be displayed on kiosk display 115. The image may depict how the product appears with or without its packaging, and may further indicate that the product is available in a variety of colors, and may show those colors next to the product or may show actual pictures of the product in each color. The information displayed alongside the product may provide details about the product such as size, price, reviews, location in the store or other data.

Some or all of the home décor items available at the retail establishment may be associated with one or more colors. The colors associated with each item may correspond to (i) a color of the respective item and (ii) one or more colors that color coordinate with the color of the respective item. Users at different kiosks may make associations between home décor items and paint colors and between home décor items and other color coordinated home décor items. For instance, the associations may indicate that certain pillows go well with certain lamps or curtains or carpet, or that certain paint colors go well with certain kitchen items.

Many kiosks installed in a variety of different locations countrywide may receive user inputs, and each user's inputs may be monitored and tracked. The associations they make between products and colors, and between products and other products may be identified and categorized over time. These learned associations may be used to suggest products, paint colors, home décor items or even other home projects to users, based on what kiosks in that area or other areas have learned about users in that area or about kiosk users in general.

In one example, a kiosk or plurality of kiosks may provide color and home décor item associations to a central repository (e.g. database 118) which identifies trends or new associations between products and colors or products and other products. These trends may be confined to one geographic region, or may be countrywide or worldwide. Thus, the kiosks may be configured to display or otherwise suggest to the user associations that are popular in that area or region, or are trending that day, week, month or year. The kiosk may thus be continually updated to show the latest color recommendations or product recommendations based on a selected color or product. The central repository may further be configured to store the home décor items and/or paint colors, along with the associated trends.

As such, identifying home décor items that have colors that coordinate with the at least one color of the presented home décor item 107 may be based on color and home décor item relationships 119 identified by multiple other users. It should be noted that the other users need not be kiosk users. Indeed, the database 118 may retrieve and store color and home décor item associations from users on web sites, from social media feeds or from any other source of associations. If the user is presented with an available home décor item 117 in which they are interested, they may select that item and may further indicate (explicitly or implicitly) that the association between paint color and product or between product and product is a good one. In this manner, kiosk users may provide input for identifying the colors associated with respective items for color coordination. The colors associated with each item for color coordination may be selected from colors available from a specific paint manufacturer, or may be available from multiple paint manufacturers.

Any relationships between paint colors and home décor items may be stored in the database 118 for implementation in future home projects or in other kiosk users' home projects. The home décor items that were selected by the user may be stored in the user's profile, and may be used to identify specific product color associations for that user in the future. This database of relationships may be accessible online by different kiosks and/or by mobile computing devices or other web-enabled devices. Thus, multiple users may provide input indicating which products and paint colors go together, and which products and paint colors will look good in a certain room or for a given project. The kiosk may then use these associations and relationships to give useful product recommendations to other kiosk users that are looking for home décor items.

FIG. 3 illustrates a flowchart of a method 300 for identifying and selecting, for a home project, home décor items of a retail establishment that color coordinate. The method 300 will now be described with frequent reference to the components and data of environment 100. A system may be provided that implements the method 300. The system may include a computerized device for positioning at a kiosk at a point of sale location corresponding to a retail establishment, where the computerized device includes a display and an input device. The computerized device may be configured to perform the method 300.

Method 300 includes receiving an indicator of a home décor item (310). For example, the receiving module 109 of kiosk computer system 101 may receive home décor item indicator 107. As explained above, this home décor item indicator 107 may be any type of name, number or code that identifies a product. In some cases, as shown in FIG. 6, the kiosk 601 may include a barcode scanner 607 which is configured to scan the barcode of products brought to the kiosk by the user. In such cases, the indicator of the home décor item 107 is a barcode.

Method 300 also includes identifying a color associated with the indicated home décor item (320), determining one or more other home décor items that have colors that coordinate with the color of the indicated home décor item (330), and displaying images of the one or more other home décor items on the display (340). Method 300 further includes receiving user input via the input device selecting one or more of the displayed home décor items (350), and informing the user via the display which of the selected home décor items are available at the retail establishment (360).

The system that executes the method 300 may further include a database 118 that associates each home décor item in the retail establishment with other home décor items in the retail establishment that have colors that coordinate therewith. In some cases, the color and home décor item associations 119 are provided by a single user, while in other cases, the color and home décor item associations are provided by multiple users. In these scenarios, the associations 119 are said to be crowd-sourced.

Figure 4:
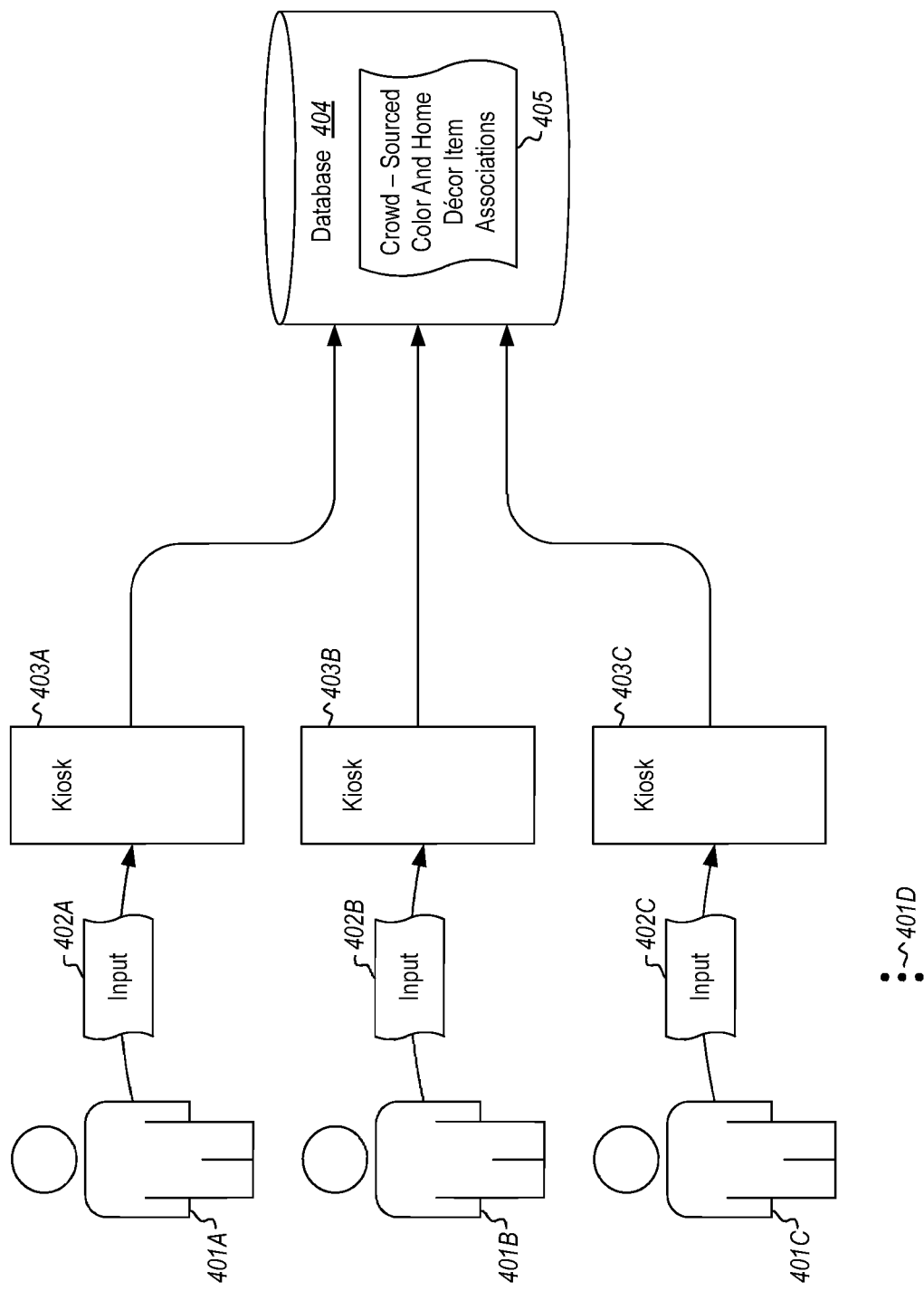
FIG. 4 illustrates a scenario in which color and home décor item associations are crowd-sourced.

FIG. 4 illustrates how crowd-sourced color and home décor item associations may be generated. The kiosk computer system 101 of FIG. 1 may be one of many different kiosks placed across the country and across the world. Thus, while only three kiosks are shown in FIG. 4 (i.e. 403A, 403B and 403C), it will be understood that substantially any number of kiosks may provide crowd-sourced color and home décor item associations 405 (as indicated by ellipses 401D).

Still further, it will be understood that other users such as bloggers and social media users may add to and modify the store of crowd-sourced color and home décor item associations 405. Each kiosk user 401A, 401B and 401C provides input 402A, 402B and 402C, respectively, to the kiosks. These kiosks may all be in different physical locations. Each input provides indicators of home décor items 107 or home décor item selections 108 that provide relationships between products provided by the user and products determined to color match the provided product. Each relationship may be stored in the database 404. When multiple users make the same association, that association may have greater weight, and may be recommended more frequently to other users. Contrariwise, if an association is made by relatively few users, that association may be recommended less frequently to kiosk users.

The database itself 404 may be a local or distributed database such as a cloud database. The database 404 may be accessible by other kiosks or via the web or via applications running on a mobile device. Thus, the database that associates each home décor item in the retail establishment with other home décor items in the retail establishment that have colors that coordinate therewith is accessible by other kiosks and other computing devices. In this manner, an ever-growing, continually modified store of crowd-sourced color and home décor item associations 405 may be maintained on the database 404. These associations may be used to recommend products to users that would color coordinate with other home décor items or paint colors that they have selected. In this manner, a kiosk user may be able to quickly and easily get a good idea of which products would match with a given product, and which matching products are available for immediate purchase in that store.

Accordingly, methods, systems and computer program products are provided which identify and select, for a home project, home décor items of a retail establishment that color coordinate, through a kiosk at a point of sale location corresponding to the retail establishment. Moreover, methods, systems and computer program products are provided which identify and select, for a home project, home décor items of a retail establishment that color coordinate.

As used in the specification, a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Furthermore, as used in the specification and appended claims, directional terms, such as "top," "bottom," "left," "right," "up," "down," "upper," "lower," "proximal," "distal" and the like are used herein solely to indicate relative directions and are not otherwise intended to limit the scope of the invention or claims.

In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element; while the element label will include an appended letter (e.g., "20a") when referring to a specific instance of the element.

The concepts and features described herein may be embodied in other specific forms without departing from their spirit or descriptive characteristics. The described features are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computerized method for identifying and selecting, for a home project, home decor items of a retail establishment that color coordinate, through a kiosk at a point of sale location corresponding to the retail establishment, comprising:

receiving from a user at the kiosk, an indicator of a home decor item;

identifying, by the kiosk, at least one color associated with the presented home decor item, wherein:
the kiosk includes a digital code scanner for reading a bar code or a QR code, and a spectrophotometer, and
the at least one color is identified by the kiosk performing at least one of: (i) reading the bar code or QR code, or (ii) reading spectrophotometric information from the spectrophotometer;

determining, by the kiosk, from the identified bar code, QR code, or spectrophotometric information one or more other home decor items that have colors that coordinate with the at least one color of the presented home decor item;

wherein at least one of the coordinating colors (i) is a crowd sourced color representing color input from multiple different users at multiple other kiosks, and (ii) has been weighted over another associated color based on a characteristic of one or more other users at different geographic locations;

displaying to the user, by the kiosk, images of the determined one or more other home decor items;

receiving, by the kiosk, user input selecting one or more of the displayed home decor items;

sending, by the kiosk, the user input selection to a remote crowd-sourced database hosting crowd-sourced color and home decor item associations;

informing the user, by the kiosk, which of the selected home decor items are available at the retail establishment.

2. The computerized method of claim 1, further comprising automatically retrieving an image and/or data corresponding to the available selected home decor items, and displaying the retrieved image and/or data on a kiosk display.

3. The computerized method of claim 1, wherein informing the user, by the kiosk, which of the selected home decor items are available at the retail establishment further comprises the kiosk indicating where to locate the available selected home decor items in the retail establishment.

4. The computerized method of claim 3, further comprising communicating, by the kiosk, to a retail establishment personnel to indicate that the kiosk user is interested in locating the selected home decor items.

5. The computerized method of claim 1, further comprising associating each home decor item available at the retail establishment with one or more colors, the one or more colors associated with each item corresponding to (i) a color of the respective item and (ii) the at least one crowd-sourced color.

6. The computerized method of claim 5, wherein the one or more colors associated with each item for color coordination are selected from colors available from a specific paint manufacturer.

7. The computerized method of claim 5, wherein kiosk users provide input for identifying the one or more colors associated with respective items for color coordination.

8. The computerized method of claim 5, wherein relationships between paint colors and home decor items are stored in the remote crowd-sourced database for implementation in other kiosk users' home projects in other geographic locations.

9. The computerized method of claim 8, wherein:
the remote crowd-sourced database is accessible online by a plurality of different kiosks; and
the remote crowd-sourced database stores information regarding selection weighting, the selection weighting based on coordinating color or coordinating home decor selections by other users at other locations based on the presented home decor item.

10. The computerized method of claim 1, wherein:
the indicator for the home decor item comprises a unique identifier; and
the indicator for the home decor item is received via a spectrophotometric read of a sample item brought from home.

11. The computerized method of claim 1, further comprising:
receiving from the remote crowd-sourced database an update to the coordinating colors based on input from another user at another kiosk;
updating, by the kiosk, at least one color association with the presented home decor item; and
displaying, upon presentation by another user of the presented home decor item, at least one different color corresponding to the received update.

12. A system for identifying and selecting, for a home project, home decor items of a retail establishment that color coordinate, comprising:
a computerized device for positioning at a kiosk at a point of sale location corresponding to a retail establishment, the computerized device comprising (i) a display, (ii) a code scanner for scanning a barcode, QR code, or RFID, (iii) a spectrophotometer, and (iv) an input device, the computerized device being adapted to:
receive an indicator of a home decor item by (i) scanning a barcode, QR code, or RFID presented by the home decor item, or by (ii) identifying spectrophotometric information of the home decor item via the spectrophotometer, wherein the indicator is received by the kiosk scanning a product presented by a user;
determine a color associated with the indicated home decor item;
determine one or more other home decor items that have colors that are associated with the color of the indicated home decor item, wherein the determination is made by retrieving a crowd-sourced association of the one or more other home decor items with the indicated home decor item from a remote crowd-sourced database;
display images of the one or more other home decor items on the display, wherein at least one of the displayed other home decor items includes a weighting indicator that indicates how many other users select the displayed other home decor item as coordinating with the presented product;
receive user input via the input device selecting one or more of the displayed home decor items; and
inform the user via the display which of the selected home decor items are available at the retail establishment.

13. The system of claim 12, wherein the computerized device includes a barcode scanner and wherein the indicator of the home decor item is a barcode.

14. The system of claim 12, wherein the color associated with the indicated home decor item is represented by a plurality of paint swatches specific to a single paint manufacturer.

15. The system of claim 12, further comprising a remote, crowd-sourced database that associates each home decor item in the retail establishment with other home decor items in the retail establishment that have colors that coordinate therewith.

16. The system of claim 15, wherein the database that associates each home decor item in the retail establishment with other home decor items in the retail establishment that have colors that coordinate therewith is accessible by one or more other kiosks.

17. A kiosk computer system comprising:
one or more processors;
a receiving module, the receiving module receiving from a user an indicator of a home decor item;
wherein the receiving module comprises: a (i) digital code scanner that scans a barcode, QR code, or RFID identifiable in a product or a paint chip presented by a user; and (ii) a spectrophotometer that identifies spectrophotometric information in a product or a paint chip presented by the user;
a color identifying module, the color identifying module identifying at least one color associated with the presented home decor item;
a home decor item determining module, wherein the home decor item determining module determines one or more other home decor items that have colors that are associated with the at least one color of the presented home decor item, wherein the home decor item determining module interfaces with a remote, crowd-sourced database to determine the association of the one or more other home decor items based on a characteristic of one or more users of a plurality of users represented in the crowd-sourced database;
a display, wherein the display displays to the user images of the determined one or more other home decor items, along with a weight value corresponding to selections by one or more users of the plurality of users;
the receiving module receiving user input selecting one or more of the displayed home decor items; and
an informing module, the informing module informing the user which of the selected home decor items are available at the retail establishment;

wherein the display indicates associations that are popular among other users in a geographic region of the user.

18. The kiosk computer system of claim 17, wherein:
the characteristic of the one or more users is geographic location; and
the act of determining one or more other home decor items that have colors that are associated with the at least one color of the presented home decor item comprises weighting the associations identified based on geographic locations of each user in the plurality relative to a geographic location of the user of the kiosk.

19. The kiosk computer system of claim 17, wherein the informing module displays a map and directions to the specific aisle in the retail establishment that has the selected home decor items.

20. The kiosk computer system of claim 17, wherein the kiosk is configured to:
receive from the remote crowd-sourced database an update to one or more coordinating colors based on input from another user at another kiosk;
update, by the kiosk, at least one color association with the presented home decor item; and
display, upon presentation by another user of the presented home decor item, at least one different color corresponding to the received update.

* * * * *